June 28, 1960

J. A. PAULI 2,942,812

COMBINED LOADING RAMP AND INTERIOR
PRESSURIZATION DOOR FOR AIRCRAFT

Filed May 28, 1958

INVENTOR.
JULIUS ANTHONY PAULI

BY

*George C. Sullivan*

Agent

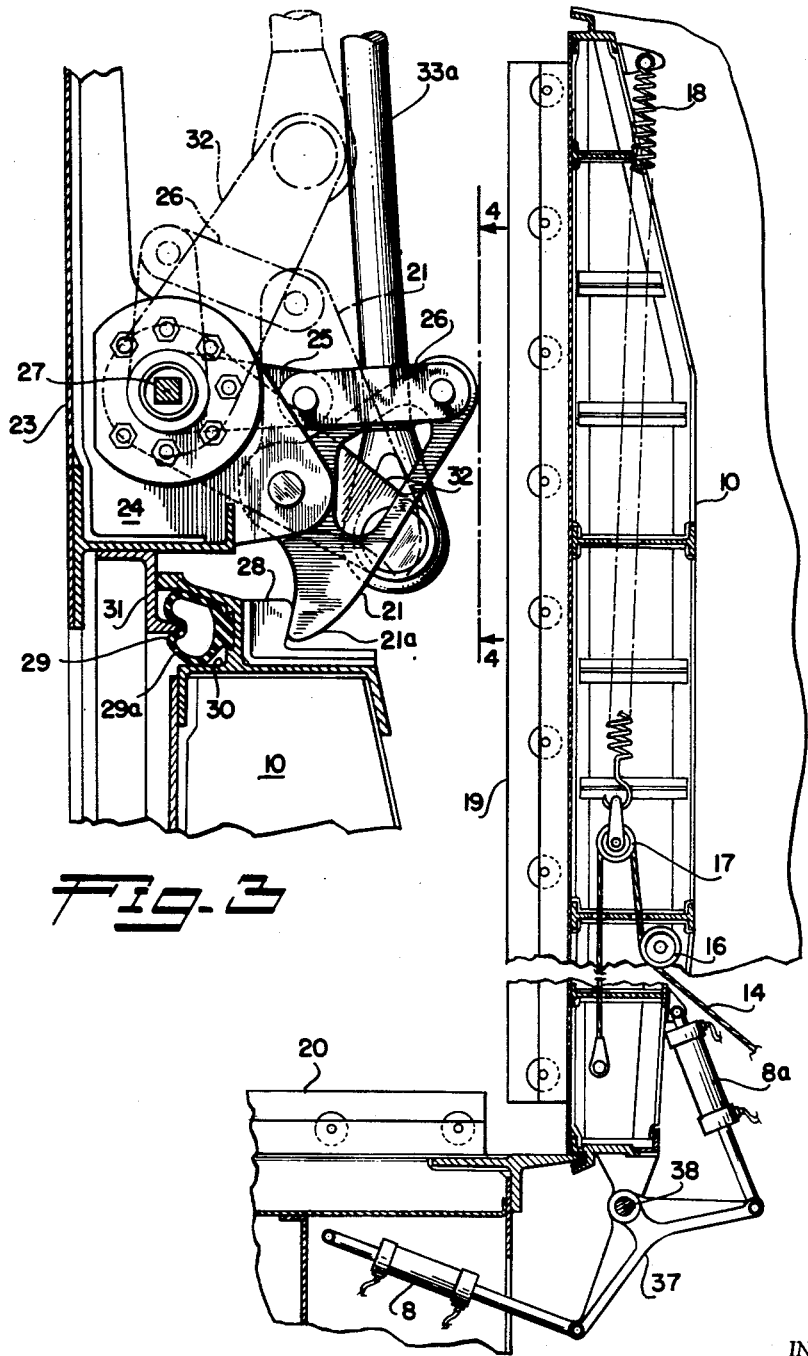

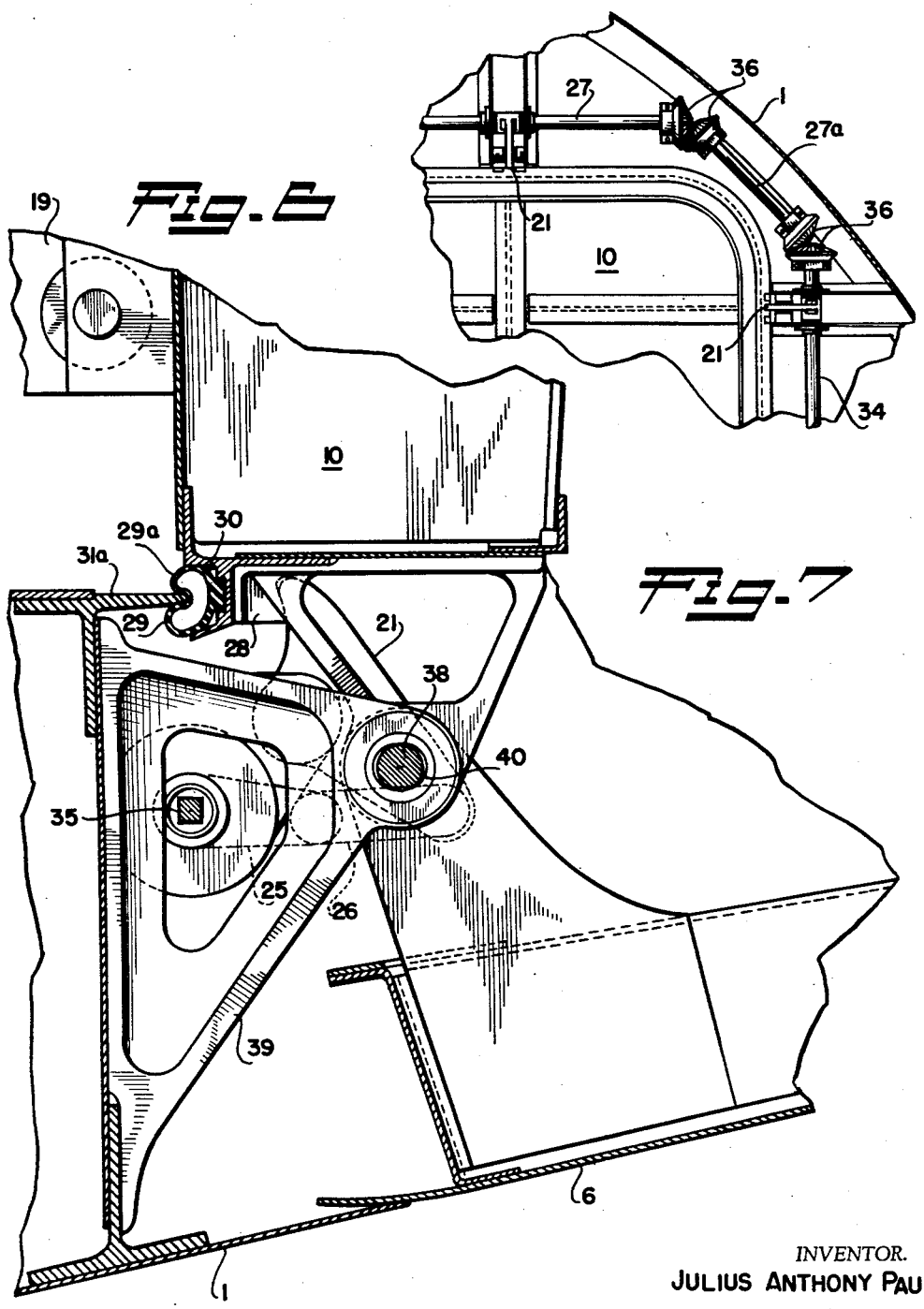

United States Patent Office 2,942,812
Patented June 28, 1960

2,942,812

COMBINED LOADING RAMP AND INTERIOR PRESSURIZATION DOOR FOR AIRCRAFT

Julius Anthony Pauli, Marietta, Ga., assignor to Lockheed Aircraft Corporation, Burbank, Calif.

Filed May 28, 1958, Ser. No. 738,554

12 Claims. (Cl. 244—118)

This invention relates to aircraft, and more specifically to a combined structure serving as an interior pressurization door when closed and as an on and off cargo loading ramp when open.

With aircraft of the type having openings for on and off loading of cargo, pressurization of the aircraft interior during high altitude flights presents difficulties such as having to pressurize unusable volumes of space within the fuselage in addition to the usable volumes of space plus considerable leakage through the cargo doors in the outer fuselage structure. These difficulties have been overcome heretofore through means resulting in undesirable effects by increasing the capacity, and hence the weight, of pressurization equipment, or by attempts to seal around the outer cargo doors, which again causes increments in the aircraft weight.

The volume of space extending aft of the cargo doors in a rear loading plane or extending forward of the cargo doors in a forward loading plane, whichever the case may be, is usually formed by forward or aft fuselage structure necessitated to give an aerodynamically efficient fuselage shape and/or supporting the empennage to the fuselage. During high altitude operation with the interior of the aircraft pressurized this unusable volume of space is likewise pressurized, requiring the pressurization equipment to be of larger capacity than actually needed, and hencely heavier. This in turn reduces the effective payload of the aircraft. Additional weight penalty is encountered by the necessity of having the fuselage surface and structural members around such unusable areas or volumes of the aircraft interior structurally strengthened to carry pressurization loads thereon or therein in addition to flight loads.

Likewise, if pressurization of the unusable volume of space can be eliminated, there is a corresponding elimination of the need of heavy and troublesome strengthening structures or mechanisms between adjacent surfaces of doors and fuselage structures, as well as the more difficult sealing locations between two adjacent relatively movable or adjustable door surfaces as represented by outer cargo doors. Because of the extreme difficulty in the latter type of seal location, there is a substantial amount of leakage therethrough during pressurized operation, thereby requiring a larger capacity of pressurization equipment to compensate for the loss of efficiency occasioned by such leakage.

Notwithstanding the desirability of accomplishing an overall weight reduction of the aircraft and a more effective and efficient pressurization means and accomplishment, it is to be understood that it is objectively preferable, if not mandatory, that any means or method of realization of such results will not reduce the overall size or volume of cargo or payload that can be accommodated, or to interfere with any aerial delivery capability of the aircraft, if such is the case.

Accordingly, it is an object of this invention to provide an aircraft with an arrangement whereby interior pressurization for high altitude flight is effectively limited to the flight crew compartment and the usable cargo and/or payload compartment.

A further object of this invention is to provide interior pressurization of cargo aircraft with a minimum of leakage and more efficient and effective use of pressurization equipment.

A still further object of this invention is to provide lighter fuselage surface and structural members around the unusable space or volume in cargo aircraft by eliminating the interior pressurization of such spaces whereby such surface or structural members need be designed for flight loads only rather than having to be designed for pressurization loads as well as flight loads.

Another object of this invention is to provide for increase in the range and/or payload of a cargo aircraft of the same gross weight.

Still another object of this invention is to provide a structure in an aircraft for effectively maintaining the pressure differential between a pressurized usable cargo or payload compartment and an unusable space or volume within the aircraft, such structure cooperable with openable outer fuselage doors designed only for carrying flight loads.

It is still another object of this invention to provide a structure for maintaining the pressure differential between the pressurized usable cargo or payload compartment space and an unpressurized unusable space or volume within the aircraft fuselage envelope that is also functionable as a cargo loading and unloading ramp thereby eliminating the structural strength requirements in an outer cargo door to accomplish use as a cargo ramp.

It is a still further object of this invention to provide pressurization of the interior of a cargo aircraft with elimination of pressurized air leakage around the edges of openable cargo doors therein.

Still another object of this invention is to provide an arrangement in an aircraft between the above objects while still maintaining the size and/or volume of usable or permissible cargo or payload handling capabilities or capacities, in addition to maintaining the use of any aerial delivery capabilities of the aircraft, if such be the case.

Further objects and advantages of this invention will become apparent from the following description taken in connection with the accompanying drawings in which:

Figure 3 is a view taken along line 3—3 of Figure 2;

Figure 5 is a view taken along line 5—5 of Figure 2;

Figure 6 shows enlarged details of the interconnection between the locking latching actuating drive shafts;

Figure 7 is a view taken along line 7—7 of Figure 2;

Figure 8 shows enlarged details of the locking means on the pressure door brace mechanisms; and Figure 9 is a view taken along line 9—9 of Figure 8.

Generally stated, one embodiment of this invention is practiced by a combined ramp-pressure door which is designed to maintain a pressure seal between the cargo or payload compartment in an aircraft and the exterior of the aircraft fuselage when the door is closed. When opening the cargo compartment for free access or communication between the fuselage exterior and the cargo compartment, the pressure door is actuable in conjunction with the outer, or one of the outer, cargo doors, whichever the case may be, with the pressure door serving as the cargo loading or unloading ramp. Thus, the structurally heavy combined ramp-pressure door carries the pressure differential between the pressurized cargo compartment and the unpressurized unusable volume or space of the fuselage envelope that is beyond the cargo compartment, as well as serving as the load carrying ramp for cargo loading or unloading operations. This in turn eliminates the need for the unusable volume of space within the fuselage envelope to be structurally strengthened so as to carry both flight loads and pressurization loads, such fuselage surface and structural members having to be designed only for flight loads. Likewise, such reduction in the pressurized volume during high altitude pressurized flight operation reduces the required capacity of the pressurization equipment plus the additional capacity of the pressurization equipment necessitated by considerable and unpreventable pressure leakage around the cargo doors in the aircarft fuselage surface.

Figure 1:
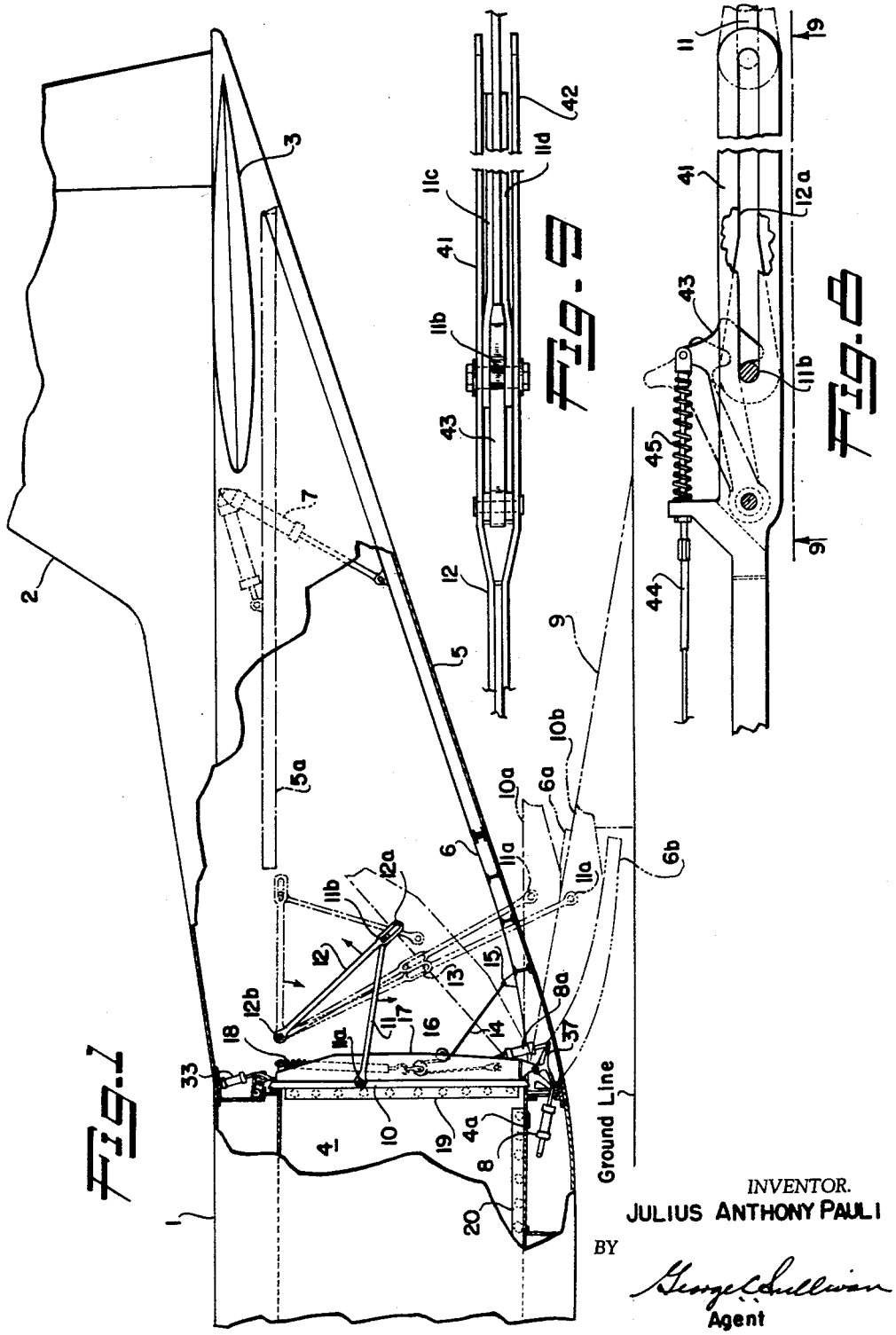
Figure 1 is a partial and cross sectional view in elevation of the aft portion of a cargo aircraft employing rear on and off loading, with all access doors to the interior of the cargo compartment shown in closed position by the full lines, and in open position by the phantom lines.

Referring more specifically to the drawings, in Figure 1 is shown the aft portion of an aircraft fuselage 1 with a vertical fin 2 and horizontal stabilizer 3 extending therefrom. Within fuselage 1 is a cargo compartment 4 with access thereto from outside the aircraft through a pair of cargo doors 5 and 6; retraction of actuator 7 opening aft cargo door 5 inwardly and upwardly to a position 5a as indicated by the phantom lines, while an actuator means opens forward cargo door 6 downwardly and outwardly to positions 6a or 6b as indicated by phantom lines by actuators 8 and 8a being retracted simultaneously as explained in detail hereinafter. The difference between positions 6a and 6b of forward cargo door 6 being such that position 6a permits direct movement of cargo from floor 4a of cargo compartment 4 to a truck or trailer bed or vice versa, or for aerial delivery, while position 6b allows movement of cargo to or from floor 4a of cargo compartment 4 directly with the ground in conjunction with an inclined ground ramp 9.

In order to accomplish an effective pressurization seal at the aft end of cargo compartment 4 there is an internal pressurization door 10, which is positioned upright when all the cargo doors are closed, and having means for effecting a peripheral seal with the aft transverse rim or edges of cargo compartment 4 for maintainance of pressurization therein plus means for effectively latching and holding pressure door 10 in place, both of which will be described in more detail hereinafter. Pressure door 10 can be opened to positions 10a and 10b as indicated by the phantom lines, and which similarly correspond to positions 6a and 6b of forward cargo door 6 as described above. It is to be understood that two actuators are required when door 10 is to be rotated more than 90° to avoid adding control complexity should only one actuator be used, for if such were the case, the actuator shaft would have to operate in both directions during each opening or closing of door 10.

Support of pressure door 10 when open is accomplished by a pair of brace members 11 and 12 on each lateral side of the door and fuselage structure and in view of the duplicity of the brace members for both lateral sides of door 10 the bracing for only one side of door 10 is shown for sake of clarity. Brace member 11 is pivotally connected at one end thereof to the lateral side of door 10, while the other end is pivotally interconnected with brace member 12 by a pin or lug extending into a slot 12a at one end of brace member 12. The other end of brace member 12 is pivotally connected to fuselage 1 at a point 12b. There is a locking arrangement to maintain pin 11b of brace member 11 at the end of slot 12a as indicated by the full lines and which will position door 10 in position 10a when opened, as the combined length of brace members 11 and 12 will then correspond to the distance from pivot 12b to pivot 11a on the lateral side of door 10. When door 10 is to be positioned as indicated by 10b, the locking mechanism between pin 11b and slot 12a is released, allowing pin 11b to travel to the other end of slot 12a thereby extending the overall length of brace members 11 and 12, as indicated by 13, so as to allow for the extended distance between pivot point 12b and pivotal connection 11a when door 10 is extended to position 10b. The arrows on brace members 11 and 12 indicate the direction of travel of the brace members when the door is to be opened from the position indicated by solid lines in Figure 1.

Forward cargo door 6 is held closed when door 10 is in a closed position by a flexible cable or wire rope 14 connected to a pedestal or tab 15 mounted on the inner side of cargo door 6. The cable or wire 14 runs through a plurality of pulleys 16 and 17 and is attached to door 10, pulley 17 being connected to a tension spring 18 which in turn is also mounted to pressure door 10. Thusly, as door 10 is opening, cargo door 6 will maintain its closed position as the tension in spring 18 is diminished until doors 10 and 6 come into abutment, and continuation of the opening of door 10 will cause cargo door 6 to move therewith, it being noted that both doors 6 and 10 rotate on the same pivotal axis. The tension in spring 18 is at a minimum when doors 6 and 10 are in abutting engagement and at a maximum when the doors are in full closed positions as shown by solid lines in Figure 1.

When pressure door 10 is open, it serves as an on and off loading cargo ramp as the door 10 is structurally sufficient to both maintain the pressurization loads when in the closed position and acting as a pressure door and to withstand the cargo weight structural loads when the door is open. This subjects door 10 to only one set of forces at any one time, either those of the pressure differential loads or the cargo weight loads. This differs from the previous situation which required forward cargo door 6 to be structurally sufficient to maintain the flight loads on the fuselage surface as well as simultaneous pressure differential loads thereon, in addition to having to be of sufficient structural strength to support or carry the cargo loads during loading or unloading operations.

Figure 2:
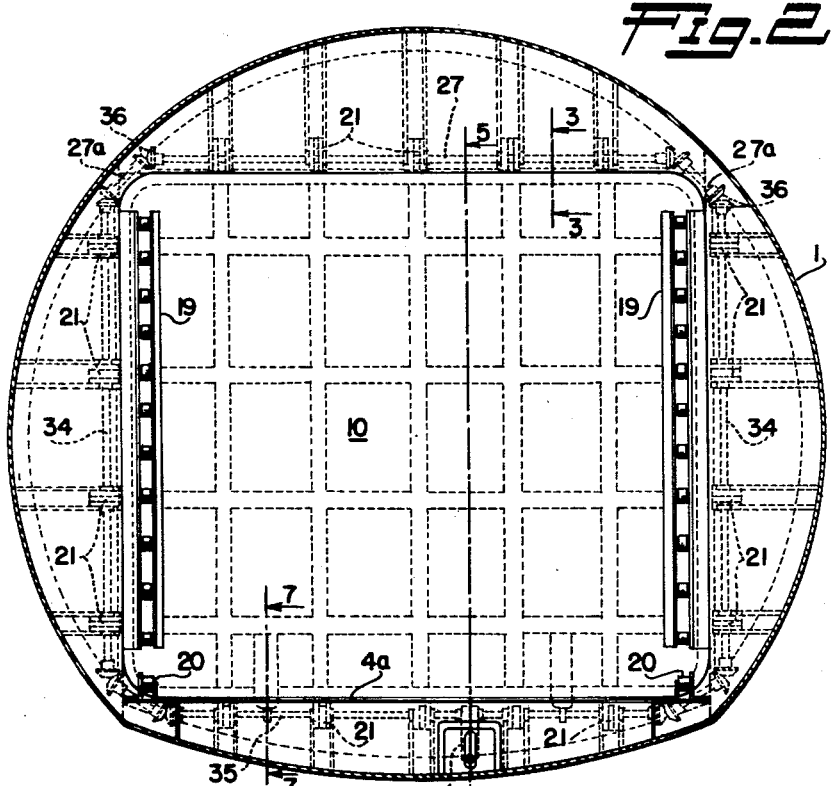
Figure 2 is a cross-sectional elevational view looking aft from the interior of the cargo compartment when the cargo compartment pressurization door is in closed position as shown by the solid lines of Figure 1.

As can be seen from Figure 2, there are cargo handling roller ways 19 secured to a side of door 10 that is the inner vertical side when door 10 is closed, and which becomes the upper side when door 10 is open. Roller ways 19 are located in coincidence with cargo roller ways 20 located on floor 4a of cargo compartment 4, so that when pressure door 10 is open, roller ways 19 and 20 form one continuous roller track.

Figure 4:
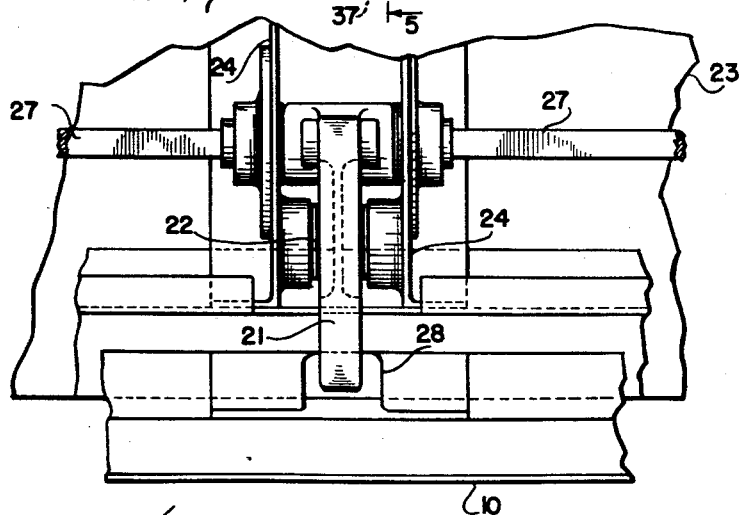
Figure 4 is a view taken along line 4—4 of Figure 3.

Referring to Figures 2, 3 and 4, there are a plurality of locking latches 21 pivotally mounted as bellcranks on fixed pivot shafts or axles 22 secured by a pair of parallel contraposed members 24 to a transverse structural frame member 23 defining the aft periphery of cargo compartment 4. A linkage arrangement comprising toggle links 25 and 26 are pivotally connected together with the other end of toggle link 26 pivotally connected to locking latch 21, and the other end of toggle link 25 drivingly connected to square torque or drive shaft 27, so that rotation of shaft 27 will in turn drive latch 21 around fixed pivot 22, as is most clearly shown in Figure 3. When locking latch 21 is in the position as shown in solid lines in Figure 3, the portion 21a of latch 21 engagingly bears against the outer surface of a locking lug 28 connected to the rim of door 10. This in turn causes seal strip 29, located in a peripheral groove 30 around door 10 and flange 30a, to ride in engagement against flange 31 secured to transverse fuselage structural frame member 23, and effecting a seal around the periphery of door 10 thereby maintaining the pressure differential across door 10 when cargo compartment 4 is pressurized. Seal strip 29 has a plurality of openings 29a therethrough to vent the interior of seal strip 29 with the pressurized cargo compartment 4 thereby forcing the seal strip 29 into a positive engagement with flange 31.

The locking latches 21 along the sides and bottom of door 10 operate in the same manner, as does the sealing arrangement along the top with the exception of a different shaped flange 31a engaged by seal strip 29 along the bottom of door 10 as can best be seen in Figure 7, it being understood that any type or any shape sealing flange may be employed, the only requirement being that there be a tight sealing engagement between the flange and the sealing strip 29.

Rotation of the square torque or drive shaft 27 for rotation of toggle links 25 is accomplished by a lever arm 32 mounted on shaft 27 at one end and pivotally connected to actuator shaft 33a of hydraulic actuator 33 pivotally secured to the fuselage structure above the uppermost edge of door 10 when door 10 is in a closed position. Location of actuator 33 is most clearly shown in Figure 1.

In order to accomplish locking or unlocking of all latches 21 simultaneously, square torque or drive shafts 34, driving the locking latch members 21 along the sides of the door 10, and the square torque or drive shaft 35, driving the locking latches 21 along the bottom side of door 10, are interconnected with drive shaft 27 by bevel gears 36 and shafts 27a as shown in Figure 6. With this interconnecting of locking latch drive shafts 27, 34 and 35, all of the locking latches 21 can be moved simultaneously, and by one actuator as indicated.

Referring to Figure 5, movement of door 10 is accomplished by the shafts of actuators 8 and 8a being pivotally connected to the lever arm of a bellcrank 37 that is freely rotatively mounted on a hinge shaft 38. Actuator 8 is pivotally connected to the internal fuselage structure, while actuator 8a is pivotally connected to door 10. The door 10 is caused to rotate around hinge shaft 38 in an opening direction by simultaneous retraction of both actuators 8 and 8a, and in a closing direction by simultaneous extension of both actuators 8 and 8a. Hinge shaft 38 serves as the pivotal axis of pressure door 10, forward cargo door 6, and bellcrank 37.

Referring to Figure 7, hinge shaft 38 is held in place by a plurality of support brackets 39 rigidly secured to the structure of fuselage 1. Because of the action of locking latches 21 causing a slight fore and aft movement of door structure 10 when locking or unlocking thereof for effectuating the pressure seal of the cargo compartment 4, the openings 40 in support brackets 39 for passage of the hinged shaft 38 are slightly ovate or elongated to compensate for the slight fore and aft relative movement between the axis of hinge shaft 38 and support brackets 39.

Figures 8 and 9 disclose the details of adjusting the combined overall length of braces 11 and 12 controlling the position of door 10 when open, as described above. The end of brace 12 may be bifurcated to form arms 41 and 42 between which is located the pinned end of brace member 11 having pin 11b. The outer ends of pin 11b ride in the elongated slots 12a of the arms 41 and 42 of bifurcated brace member 12. To maintain the pin 11b in the position as indicated by full lines, which in turn means that the ramp surface of door 10 when opened will level with the floor 4a of cargo compartment 4, there is a locking catch 43 pivoted between the arms 41 and 42 of bifurcated brace member 12 which will rotate down over the center portion of pin 11b between the arms 11c and 11d of bifurcated brace member 11. If it is desired to increase the overall length of brace members 11 and 12 so that the door 10 can be opened to its maximum position 10b for ground level loading or unloading, the locking catch 43 is released by an axial movement of control cable 44, which causes further compression of the spring 45 and disengagement of locking catch 43 with pin 11b, thereby permitting a relative movement between brace members 11 and 12 by pin 11b moving to the opposite end of elongated slots 12a as indicated by the phantom lines in Figure 8.

In operation, presuming the door 10 is open to one of the positions 10a or 10b of Figure 1, closure is accomplished by simultaneous extension of both actuators 8 and 8a causing pressure door 10 and outer door 6 to swing inwardly around hinge shaft 38, the doors 6 and 10 moving in unison as forward cargo door 6 is held in engagement with door 10 by the tension in spring 18. When the longitudinal sides of door 6 engage with the edges of the outer fuselage structure, the door 6 will remain in that position while door 10 continues rotation around hinge shaft 38 until it becomes upright to form the end of the cargo compartment 4. After the upper or outer edge of door 10 passes the point where aft cargo door 5 can be closed without interference with door 10, actuator 7 is extended to swing the aft cargo door 5 downwardly and outwardly until it achieves the position indicated by solid lines in Figure 1, the cargo doors 5 and 6 presenting substantially continuous surfaces fairing smoothly with the stationary outer surface of fuselage 1.

Locking of door 10 to provide pressure sealing of the end of cargo compartment 4 is accomplished by extension of actuator 33 causing rotation of locking latch drive shafts 27, 34 and 35 rotating all of the locking latches 21 in unison to abut each of the locking latches 21 in engagement with the corresponding locking lugs 28 for forcing the door structure in a slight longitudinal motion providing a positive engagement between seal strip 29 and flanges 31. Pressurization of cargo compartment 4 can then be accomplished without having to pressurize the unusable volume of space within the fuselage structure that is aft of the pressure door 10. This in turn means that the pressurization equipment in the aircraft can be of a smaller capacity as there is a smaller volume to be pressurized and loss of pressurized air by leakage through any heavy and impractical sealing structures between and around cargo doors 5 and 6 is eliminated. There is also an effective pressurization seal by the use of vent passages 29a in seal strip 29 allowing the pressurized air of cargo compartment 4 to increase the engagement forces of seal strip 29 on flanges 31.

Also, since the interior volume of space defined by the fuselage 1 that is downstream of the pressure door 10 is not pressurized, the cargo doors 5 and 6 can be made substantially lighter in that they do not require the strength to withstand the structural loads of flight loads as well as concurrent pressurization loads. Likewise, door 10 can be lighter in that it does not have to withstand concurrent flight and pressurization loads, but must only stand the pressurization loads during pressurized flight operation or cargo weight loads during on or off loading cargo operations, which occurs at a time when there are no pressurization loads.

Although there is an addition of elements or parts in a structure such as described above, because of the lighter load factors on the individual members or elements, substantial weight saving in the overall empty weight of the aircraft can be accomplished; as an example, the addition of pressure door 10 to a C-130 type cargo aircraft results in an overall aircraft weight reduction of 1200 lbs. This of course means that for the same gross weight operation of the aircraft, an additional 1200 lbs. of payload may be carried, or an additional 1200 lbs. of fuel may be carried, thus increasing the range of the aircraft.

As can be seen, I have accomplished this substantial weight reduction of the aircraft without reducing or interfering with the size, shape or volume limitations of cargo pieces previously adaptable to the aircraft, nor have I interfered with the aerial delivery capabilities of the specific aircraft depicted, as the combination ramp-pressure door can still be lowered during flight for the aerial delivery of cargo therefrom.

While one particular embodiment of the invention has been illustrated and described, it will be obvious to those skilled in the art that various changes and modifications may be made without departing from the invention and it is intended to cover in the appended claims all such modifications and equivalents that fall within the true spirit and scope of this invention.

What is claimed is:

1. In an aircraft fuselage having a cargo carrying compartment, the combination of a first door forming at least a portion of one of the enclosing surfaces of the cargo compartment, a second door external of the cargo compartment and fitting an opening in the fuselage surface, said second door formed to present a smooth continuation of the outer fuselage surface when closed, both first and second doors independently mounted for pivotal rotation about a common axis within the fuselage structure, and actuator means for opening both first and second doors by rotation about the common pivotal axis allowing free access between the cargo compartment and the fuselage exterior.

2. In an aircraft fuselage having a cargo carrying compartment, the combination of a first door forming at least a portion of one of the enclosing surfaces of the cargo compartment, a second door fitting an opening in the fuselage surface, said second door formed to present a smooth continuation of the outer fuselage surface when closed, both first and second doors independently mounted for pivotal rotation about a common axis within the fuselage structure, means rotatively biasing the second door towards the first door, and an actuator means connected to the first door, said actuator means opening both doors by rotating the first door about the pivotal axis while the second door remains stationary by said rotative biasing means until both doors are in abutting engagement whereupon continuation of operation of the actuator means moves both doors simultaneously.

3. In an aircraft fuselage having a cargo carrying compartment, the combination of a first door forming at least a portion of one of the enclosing surfaces of the cargo compartment, a second door fitting an opening in the fuselage surface, said second door formed to present a smooth continuation of the outer fuselage surface when closed, both first and second doors independently mounted for pivotal rotation about a common axis within the fuselage structure, means rotatively biasing the second door towards the first door, an actuator means connected to the first door, said actuator means opening both doors by rotationg the first door about the pivotal axis while the second door remains stationary by said rotative biasing means until both doors are in abutting engagement whereupon continuation of operation of the actuator means moves both doors simultaneously, and means limiting the maximum amount of simultaneous opening of the first and second doors.

4. In an aircraft fuselage having a cargo carrying compartment, the combination as claimed in claim 3 wherein the means limiting the maximum amount of simultaneous opening of the doors is adjustable for varying the limit of the combined doors opening travel.

5. In an aircraft fuselage having a pressurizable cargo carrynig compartment, a first door forming at least a portion of one of the enclosing surfaces of the cargo compartment, pressure seal means between the circumferential perimeters of the cargo compartment enclosing surface portions of the first door and the contitguous cargo compartment enclosing surfaces, said pressure seal means maintaining a pressure differential across the first door when the door is in closed position and the cargo compartment is pressurized, a second door fitting an opening in the fuselage surface, said second door formed to present a smooth continuation of the outer fuselage surface when closed, both first and second doors independently mounted for pivotal rotation about a common axis within the fuselage structure, and actuator means for opening both first and second doors by rotation about the common pivotal axis allowing free access between the cargo compartment and fuselage exterior.

6. In an aircraft fuselage having a pressurizable cargo carrying compartment, a first door forming at least a portion of one of the enclosing surfaces of the cargo compartment, pressure seal means between the circumferential perimeters of the cargo compartment enclosing surface portion of the first door and the contiguous cargo compartment enclosing surfaces, said pressure seal means maintaining a pressure differential across the first door when the door is in closed position and the cargo compartment is pressurized, a second door fitting an opening in the fuselage surface, said second door formed to present a smooth continuation of the outer fuselage surface when closed, both first and second doors independently mounted for pivotal rotation about a common axis within the fuselage structure, means rotatively biasing the second door towards the first door, and an actuator means connected to the first door, said actuator means opening both doors by rotating the first door about the pivotal axis while the second door remains stationary by said rotative biasing means until both doors are in abutting engagement whereupon continuation of operation of the actuator means moves both doors simultaneously.

7. In an aircraft fuselage having a pressurizable cargo carrying compartment, a first door forming at least a portion of one of the enclosing surfaces of the cargo compartment, pressure seal means between the circumferential perimeters of the cargo compartment enclosing surface portion of the first door and the contiguous cargo compartment enclosing surfaces, said pressure seal means maintaining a pressure differential across the first door when the door is in closed position and the cargo compartment is pressurized, a second door fitting an opening in the fuselage surface, said second door formed to present a smooth continuation of the outer fuselage surface when closed, both first and second doors independently mounted for pivotal rotation about a common axis within the fuselage structure, means rotatively biasing the second door towards the first door, actuator means connected to the first door, said actuator means opening both doors by rotating the first door about the pivotal axis while the second door remains stationary by said rotative biasing means until both doors are in abutting engagement whereupon continuation of operation of the actuator means moves both doors simultaneously, and means limiting the maximum amount of simultaneous opening of the first and second doors.

8. In an aircraft fuselage having a pressurizable cargo carrying compartment, the structure as claimed in claim 7 wherein the means limiting the maximum amount of simultaneous opening of the doors is adjustable for varying the limit of the combined doors opening travel.

9. In an aircraft fuselage having a pressurizable cargo carrying compartment, a first door forming at least a portion of one of the enclosing surfaces of the cargo compartment, pressure seal means between the circumferential perimeters of the cargo compartment enclosing surface portion of the first door and the contiguous cargo compartment enclosing surfaces, said pressure seal means maintaining a pressure differential across the first door when the door is in closed position and the cargo compartment is pressurized, a plurality of lugs spaced adjacent the periphery around the first door on the opposite side of the cargo compartment enclosure surface portion, a plurality of locking means likewise spaced as said lugs adjacently around the cargo compartment opening closed by the cargo compartment enclosing surface portion of the first door when the first door is in closed position, means actuating said locking means to bear against the lugs on the first door for effecting a positive force on the pressure seal means when the first door is in closed position, a second door fitting an opening in the fuselage surface, said second door formed to present a smooth continuation of the outer fuselage surface when closed, both first and second doors independently mounted for pivotal rotation about a common axis within the fuselage structure, and actuator means for opening both first and second doors by rotation around the common pivotal axis when the pressure seal locking means of the first door are released thereby allowing free access between the cargo compartment and fuselage exterior.

10. In an aircraft fuselage having a pressurizable cargo carrying compartment, a first door forming at least a portion of one of the enclosing surfaces of the cargo compartment, pressure seal means between the circumferential perimeters of the cargo compartment enclosing surface portion of the first door and the contiguous cargo compartment enclosing surfaces, said pressure seal means maintaining a pressure differential across the first door when the door is in closed position and the cargo compartment is pressurized, a plurality of lugs spaced adjacent the periphery around the first door on the opposite side of the cargo compartment enclosure surface portion, a plurality of locking means likewise spaced as said lugs adjacently around the cargo compartment opening closed by the cargo compartment enclosing surface portion of the first door when the first door is in closed position, means actuating said locking means to bear against the lugs on the first door for effecting a positive force on the pressure seal means when the first door is in closed position, a second door fitting an opening in the fuselage surface, said second door formed to present a smooth continuation of the outer fuselage surface when closed, both first and second doors independently mounted for pivotal rotation about a common axis within the fuselage structure, means rotatively biasing the second door towards the first door, and an actuator means connected to the first door, said actuator means opening both doors by rotating the first door about the pivotal axis when the pressure seal locking means of the first door are released and while the second door remains stationary by said rotative biasing means until both doors are in abutting engagement whereupon continuation of operation of the actuator means moves both doors simultaneously.

11. In an aircraft fuselage having a pressurizable cargo compartment, a first door forming at least a portion of one of the enclosing surfaces of the cargo compartment, pressure seal means between the circumferential perimeters of the cargo compartment enclosing surface portion of the first door and the contiguous cargo compartment enclosing surfaces, said pressure seal means maintaining a pressure differential across the first door when the door is in closed position and the cargo compartment is pressurized, a plurality of lugs spaced adjacent the periphery around the first door on the opposite side of the cargo compartment enclosure surface portion, a plurality of locking means likewise spaced as said lugs adjacently around the cargo compartment openings closed by the cargo compartment enclosing surface portion of the first door when the first door is in closed position, means actuating said locking means to bear against the lugs on the first door for effecting a positive force on the pressure seal means when the first door is in closed position, a second door fitting an opening in the fuselage surface, said second door formed to present a smooth continuation of the outer fuselage surface when closed, both first and second doors independently mounted for pivotal rotation about a common axis within the fuselage structure, means rotatively biasing the second door towards the first door, an actuator means connected to the first door, said actuator means opening both doors by rotating the first door about the pivotal axis when the pressure seal locking means of the first door are released and while the second door remains stationary by said rotative biasing means until both doors are in abutting engagement whereupon continuation of operation of the actuator means moves both doors simultaneously, and means limiting the maximum amount of simultaneous opening of the first and second doors.

12. In an aircraft fuselage having a pressurizable cargo carrying compartment, the structure as claimed in claim 9 wherein the plurality of locking means comprises a plurality of bellcrank latches, a plurality of drive shafts, gearing means interconnecting said drive shafts, each of said locking latches drivingly connected to one of said drive shafts, and a locking means actuator for rotating one of said drive shafts which by said interconnection of all drive shafts rotates all bellcrank latches into bearing engagement with the said plurality of lugs simultaneously.

References Cited in the file of this patent
UNITED STATES PATENTS

| | | |
|---|---|---|
| 380,717 | Goldsmith | Apr. 10, 1888 |
| 2,197,824 | Young | Apr. 23, 1940 |
| 2,759,691 | Weaver et al. | Aug. 21, 1956 |